March 4, 1969  L. F. STONE  3,430,766
DEVICE FOR DETECTING MARKINGS AND EJECTING CONTAINERS
Filed June 7, 1966

INVENTOR.
Leslie F. Stone
BY
William Lokff
ATTORNEY

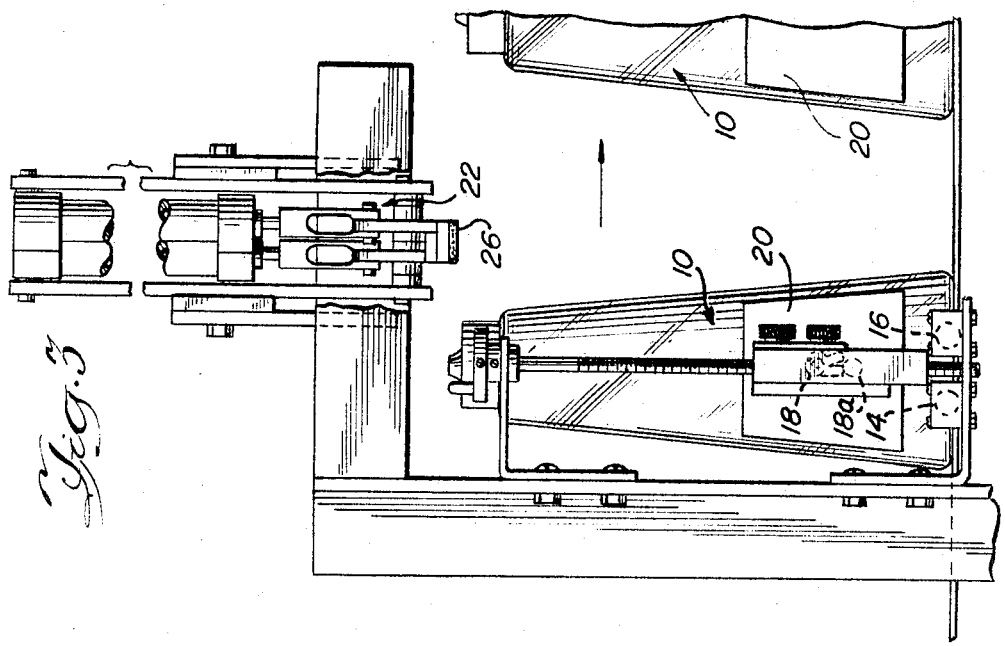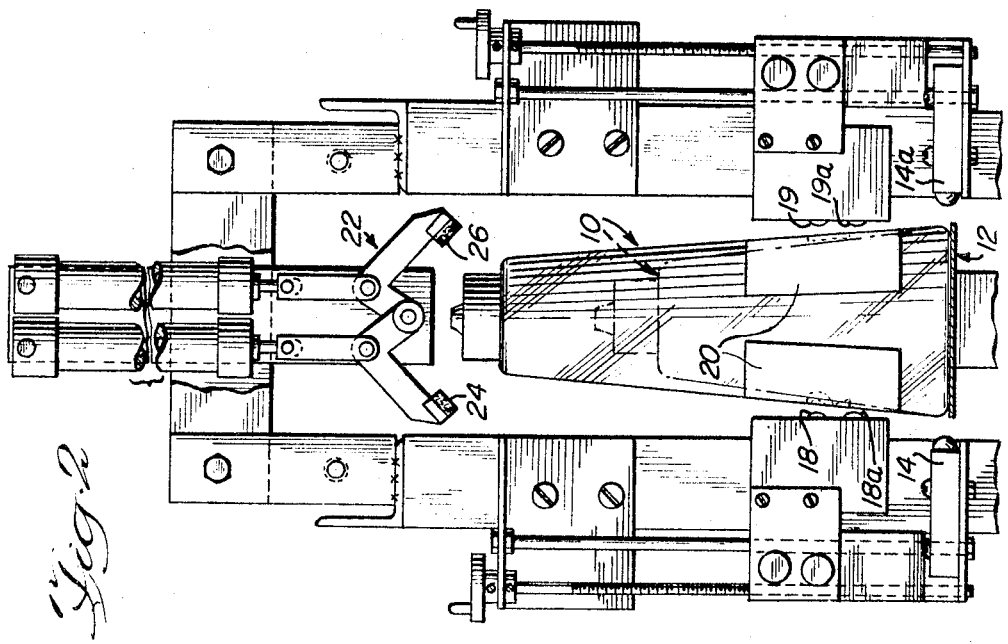

United States Patent Office 3,430,766
Patented Mar. 4, 1969

3,430,766
DEVICE FOR DETECTING MARKINGS AND EJECTING CONTAINERS
Leslie F. Stone, Westchester, Ill., assignor to The Richardson Company, Melrose Park, Ill., a corporation of Ohio
Filed June 7, 1966, Ser. No. 555,870
U.S. Cl. 209—111.7
Int. Cl. B07c 5/34; H01j 39/12
4 Claims

ABSTRACT OF THE DISCLOSURE

A device for detecting the presence of markings on contrasting backgrounds on flat or curved containers and comprising an electric bridge including a pair of photocells positioned in front of the container and an unbalance detector, ejection mechanism, and switches to detect the correct container position and to connect the unbalance detector with the energized ejection mechanism. The output from the unbalance detector is set to cancel the energizing force in the ejection mechanism when proper markings are present on the container. The device, through the use of the pair of photocell means is relatively insensitive to variations in ambient light level, color, voltage change and distance to the container.

---

This invention relates to devices for detecting markings on contrasting backgrounds on flat or curved containers and for ejecting containers which do not have the proper markings. More particularly, the invention relates to devices which are relatively insensitive to ambient light level, color and voltage variations, and to reasonable distances between the devices and the containers.

Numerous containers with a variety of shapes and markings are presently being used to package many products. The markings are usually present on labels attached to the containers and are descriptive of the product and the seller's name and identifying marks. In packaging these products, it is not uncommon that containers with improper or no markings are allowed to be processed through the packaging operation. To prevent these defective containers from reaching the customer, various techniques and devices are utilized to eject the defective containers. These devices have commonly utilized a photocell (e.g. photoelectric or photoresistive) to note the presence or absence of markings on the container. However, in many instances, their performance has been limited by variations in the intensity of the surrounding light, by variations in color of the markings and background, and by variations in voltages in the circuit of the device.

I have provided a device which exhibits advantages over the above-described devices. My device is relatively insensitive to ambient light level, color and voltage variations, and to reasonable distances between the device and the containers.

Briefly, the invention is directed to a device which comprises at least one electrical bridge means including a pair of photocell means and an unbalance detector, the photocell means being positioned in vertical alignment and in proximity to the surface of the container which normally has the markings, an ejection mechanism for ejecting containers without proper markings, and a switch means interconnecting the unbalance detector and ejector mechanism to eject defective containers when the unbalance detector does not provide a signal to indicate that the proper markings are on the container.

The invention also includes a device wherein two bridge means are positioned on opposite sides of the container and connected to the switch means and ejection mechanism so that the container can be ejected in a direction which indicates which of the markings are defective.

Having thus indicated the general nature of the invention, reference is made to the accompanying drawings forming a part of this specification and showing illustrative embodiments of this invention wherein:

FIGURE 2 is an end view showing the container and the ejection mechanism whereby a defective container can be ejected in either of two directions.

FIGURE 3 is an end view showing the container in a scanning position.

Figure 1:
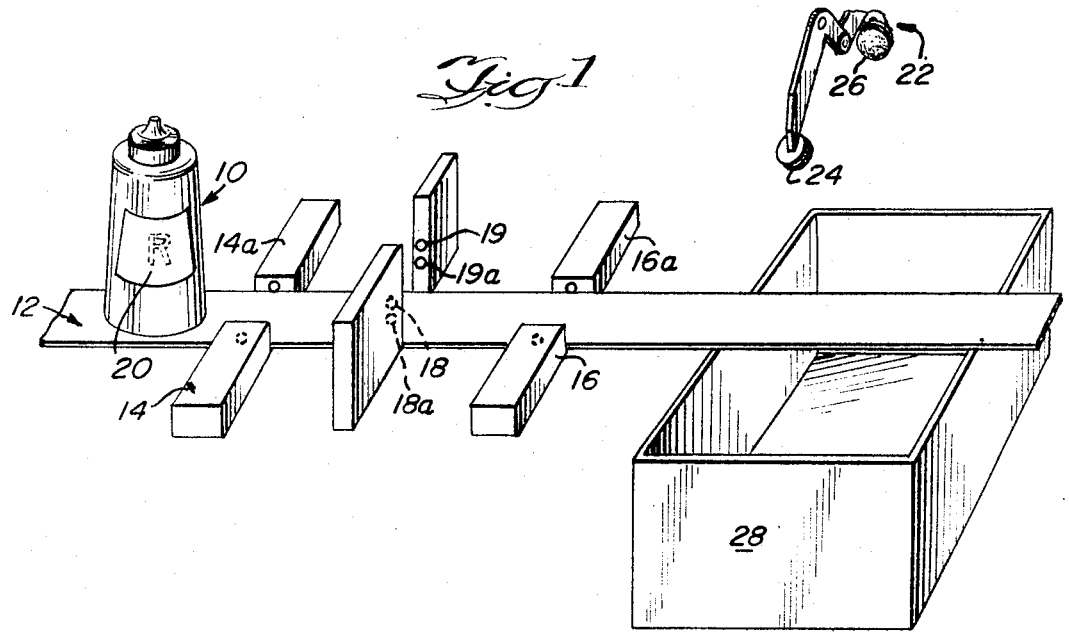
FIGURE 1 is an elevation view of a container in a conveyor system being processed by a device for detecting markings and ejecting a container with improper markings.

In FIGURE 1, container 10 is positioned on conveyor system 12 and is being processed by the detection system and the ejection mechanism. Adjacent to container 10 are photocell means, as illustrated by photoelectric cells 14 and 16. Also illustrated are two pair of opposing photocells which form part of the electric bridge means and are illustrated by photoresistive cells 18, 18a, 19 and 19a. The container passes between photocell 14 and its light beam 14a thereby breaking the beam and starting the operation. When container 10 breaks the light beam 16a to photocell 16, the trailing edge of container 10 passes beyond photocell 14 thereby returning it to its previous state. Container 10 is now in scanning position and the circuit of the bridge means scans the markings on the container 10, as illustrated by label 20. As the container 10 passes beyond photocell 16 the scanning sequence in relationship to the ejection mechanism is discontinued. If the markings 20 on container 10 are proper, container 10 passes beyond ejection mechanism 22 without being removed.

However, when there is no label 20 on container 10, ejection mechanism 22 is actuated and one of arms 24 and 26 will eject the container 10 on one side of the conveyor 12 into bin 28.

The end view in FIGURE 2 shows the container below arms 24 and 26 of ejection mechanism 22. In the operation, one of the arms is actuated, depending on which of the two labels is missing. Usually, the mechanism 22 is actuated by pneumatic pressure and is positioned a short distance from the photocells of the bridge means. Through inertia of the system, the mechanism rejects the defective container as it passes under the arms of the mechanism even though the signal is generated at an earlier time. In this way, the device will eject containers with like defects into individual collecting areas whereby they may be again processed with the proper markings.

FIGURE 3 serves to illustrate an end view of container 10 in a scanning position. In this illustration, photocells 14 and 16 are in an arrangement which can be used for a different scanning sequence.

Figure 4:
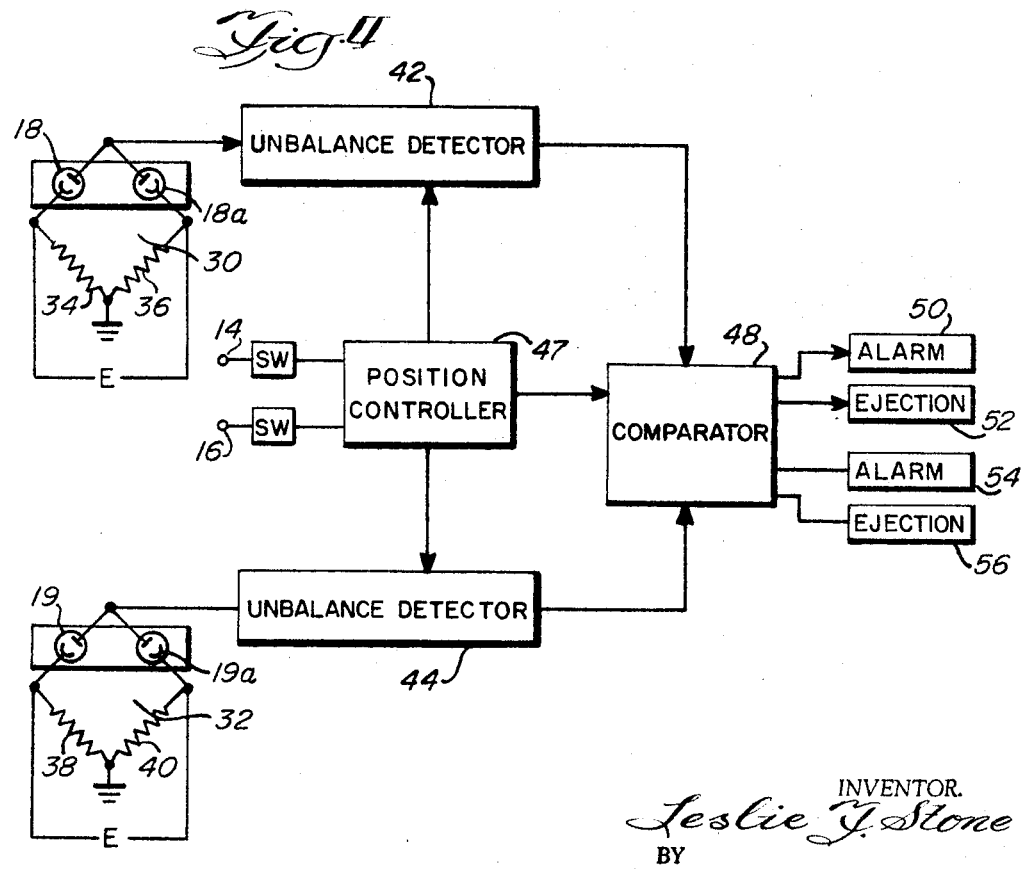
FIGURE 4 is a circuit diagram showing the interrelation of the bridge means, switch means, and ejection means.

FIGURE 4 illustrates a schematic diagram of the circuit for the device. Photocells 18, 18a, 19 and 19a are shown in their respective electric bridge means 30 and 32. Also shown are resistors 34 and 36 as part of the bridge means 30, and resistors 38 and 40 as part of the bridge means 32.

Unbalance detectors 42 and 44 provide a signal when there is an unbalance in the output of the photocells in their respective bridges. In the switching means, photocells 14 and 16 are shown connected to position controller 47. As explained above, when the container 10 is in a scanning position, the output from the detection circuit is fed to the ejection mechanism.

In FIGURE 4, position controller 47 interconnects detector circuits 42 and 44 with comparator 48. In addition, position controller 47 provides an energizing force directly to comparator 48. For example, when photocells 18 and 18a produce unbalanced outputs, which is characteristic when proper markings are on the container, detector circuit 42 provides a signal to comparator 48 which cancels the energizing force from position controller 47. Therefore, no energizing force is fed to alarm 50 and ejector 52. If photocells 18 and 18a are balanced, detector circuit 42 does not provide the cancelling signal to position controller 47. Therefore, alarm 50 and ejector 52 are energized and the container is ejected in the desired direction. In a like manner, alarm 54 and ejector 56 are energized if photocells 19 and 19a are balanced.

Although photocells have been used to describe light sensitive devices in the bridge means, these can be photoelectric and the like. In a bridge circuit, and particularly a Wheatstone bridge, photoresistive devices are particularly advantageous due to their high output.

While many conventional circuits may be utilized in the detection circuits, the position controller and comparator, it is usually advantageous to utilize relay systems because they are quite useful in switching and signalling devices. Illustrative conventional circuits which individually are suitable for the unbalance detector, position controller and comparator are illustrated in U.S. 2,781,477. Other references available include the "Handbook of Applied Instrumentation" by Considine and Ross, published by McGraw-Hill Book Company.

From the above, it is seen that the difference between this device and most photoelectric scanning systems lies in the use of two photoresistive cells in a bridge circuit. The cells are adjusted so one "sees" the darkest portion of the marking or label, while the other "sees" the lightest portion. As long as a difference exists the bridge circuit is unbalanced; however, when an unmarked or unlabeled container is "seen," both photoresistive cells "see" the same amount of light and the bridge is therefore balanced. Because of this two-cell balanced bridge principle, variations in ambient light, supply voltages, distances from container to photocells, container speed, container shape and container color have little effect on overall system sensitivity.

Having described the invention and certain exemplary embodiments, the same is only intended to be limited by the scope of the following claims.

I claim:
1. A device for detecting markings on flat or curved containers in a conveyor system and for ejecting containers without proper markings, said device being relatively insensitive to changes in ambient light level, color, voltage alteration, and to distance to the container; and comprising at least one electrical bridge means including a pair of photocell means and an unbalance detector, said photocell means being positioned in vertical alignment and in front of the surface of the container which normally has the markings, an ejection mechanism for ejecting containers without the proper markings, a container-position switch means interconnected with said unbalance detector and ejector mechanism to connect the output from the unbalance detector to the ejector mechanism when the container is in a scanning position in front of the photocell means and to directly energize the ejection mechanism whereby any output from the unbalance detector cancels the energizing force from said switch means in the ejection mechanism when proper markings are present on the container and whereby the energizing force causes the mechanism to eject the container when it is improperly marked.

2. The device of claim 1 wherein said device includes two bridge means with each pair of photocell means being positioned on the opposite sides of the container.

3. The device of claim 2 wherein said ejector mechanism comprises two overhead arms, each arm being positioned to eject the container in an opposite direction to that of the other arm, and wherein said switch means are connected so that when the proper markings are present on a particular side, the unbalance detector in that bridge cancels the energizing force to the corresponding arm and when the markings are improper on that side, the energizing force causes the arm to eject the container.

4. The device of claim 2 wherein said photocell means are photoresistive.

References Cited

UNITED STATES PATENTS

| 2,781,477 | 5/1957 | Jenner | 250—210 X |
| 2,880,328 | 3/1959 | Nordquist et al. | 250—223 |
| 3,191,068 | 6/1965 | Robb | 340—233 X |
| 3,228,520 | 1/1966 | Schneider | 250—223 X |
| 3,333,105 | 7/1967 | Kossakowski et al. | 250—210 |

WALTER STOLWEIN, Primary Examiner.

U.S. Cl. X.R.

250—223, 210